United States Patent [19]
Atzrodt et al.

[11] Patent Number: 5,612,764
[45] Date of Patent: Mar. 18, 1997

[54] DEVICE FOR COPYING PHOTOGRAPHIC MASTERS

[75] Inventors: Patrik Atzrodt, Wil; Hugo Knecht, Schöfflisdorf, both of Switzerland

[73] Assignee: Gretag Imaging AG, Regensdorf, Switzerland

[21] Appl. No.: 313,810

[22] Filed: Sep. 28, 1994

[30] Foreign Application Priority Data

Oct. 12, 1993 [EP] European Pat. Off. ............. 93810718

[51] Int. Cl.$^6$ ...................................... G03B 27/73
[52] U.S. Cl. .................................................. 355/35
[58] Field of Search ............................ 355/38, 68, 77, 355/75, 27; 356/443

[56] References Cited

U.S. PATENT DOCUMENTS

| | | | |
|---|---|---|---|
| 4,645,350 | 2/1987 | Weidmann et al. | 356/418 |
| 4,682,883 | 7/1987 | Delueg et al. | 355/38 |
| 4,764,793 | 8/1988 | Goll et al. | 355/38 |
| 5,118,183 | 6/1992 | Cargill et al. | 356/73 |

FOREIGN PATENT DOCUMENTS

| | | |
|---|---|---|
| 673065 | 1/1990 | Switzerland . |
| WO86/02176 | 4/1986 | WIPO . |

OTHER PUBLICATIONS

Prospectus X–Rite "The 800 Series" Color Process Control Densitometers (6 pages).
ANSI/ISO 5/3–1984; Density Measurements—Spectral Conditions (18 pages), Jul. 30, 1985.
European Search Report 93 81 0718.

*Primary Examiner*—Joan H. Pendegrass
*Attorney, Agent, or Firm*—Burns Doane Swecker & Mathis, L.L.P.

[57] ABSTRACT

A device for copying photographic masters onto photographic copy material, the device including a masters stage on which the master is conveyed to a measuring station where it is impacted with light and measured. Subsequently, copying light quantities required for exposure are determined from this measurement. After the measuring station, in the direction of conveyance, there is an exposure station, where the master is impacted with the determined copying light quantities and copied onto copy material. The device further includes a transmission measuring system and a reflection measuring system for measuring test masters or test copies. The transmission measuring system and the reflection measuring system are integrated, structurally speaking, in an area of the masters stage on which the master is conveyed, measured and copied onto the copy material.

8 Claims, 4 Drawing Sheets

DEVICE FOR COPYING PHOTOGRAPHIC MASTERS

BACKGROUND OF THE INVENTION

The present invention refers to a device for copying essentially transparent photographic masters onto photographic copy material, as well as a minilab for producing copies of photographic masters.

The production of copies, usually paper images, of masters, usually negative films, is carried out nowadays more or less fully automatically. The customer hands over to the retailer either an undeveloped film or already developed negatives (subsequent orders) and tells him which negative he wants copies of, how many copies and in what format he wants them. The film or the negatives are either forwarded to large development labs or are processed with what is known as a minilab or microlab at the retailer's facilities.

In large development labs as well as in minilabs, the negatives are then developed (insofar as they have not already been developed, as in the case of subsequent orders), the developed negatives are then exposed onto paper, and the exposed paper is then developed. For developing the negatives and for developing the exposed paper, wet-chemical baths are required. Whereas in large development labs, the individual system sections (wet-chemical section for the negatives, printer, wet-chemical section for the paper) are usually separate from each other, in what are referred to as minilabs they are all integrated into the minilab.

In large development labs as well as in minilabs, the wet-chemical system sections must be regularly and routinely checked in order to guarantee the quality of the copies. For this reason, the settings of the copying apparatus, i.e., the printer, must also be routinely checked on a daily basis. For these purposes, densitometers are used in the photographic industry.

For checking the wet-chemical sections, i.e., the film or paper developing baths, corresponding film chemical strips or paper chemical strips are measured. These strips have already been exposed in standardized manner at the respective film or paper manufacturer's facilities and are developed at regular intervals in the respective film or paper developing baths. The developed film or paper strips are photometrically evaluated with a densitometer and compared with the target specifications of the respective manufacturer. Depending on the results produced, the developing baths are refreshed or regenerated, renewed or maintained unchanged.

To check the settings of the photographic printer, one or more standard negatives are exposed on photographic paper and developed with a ready-to-use chemical product. The developed images are photometrically evaluated with the densitometer and compared with target standards. Depending on the values determined, the basic settings of the printer can be varied.

Densitometers suitable for such purposes are described, for example, in U.S. Pat. No. 5,118,113 and are also known in the form of apparatuses of the 880 series from the X-Rite company. These densitometers are equipped for reflection operation for opaque test strips as well as for transmission operation for transparent test strips, and they accordingly have a stationary reflection measuring system or a stationary transmission measuring system, respectively. Filters also arranged stationary inside the apparatus make it possible to determine the corresponding reflection or transmission densities of the test strip for different wavelengths, preferably for the three basic colors red, green and blue. A motor-driven conveyance device conveys the test strip through the apparatus.

With the help of such a densitometer, it is of course possible to measure the test strips, exposed in standardized manner by the manufacturer, after they have been developed in the wet-chemical baths and, using the measurement results, to verify whether the baths need to be refreshed, regenerated or renewed or whether they can be maintained unchanged. With the help of such an apparatus, it is also possible to check the basic settings of the printer in which the standard images are measured. Depending on the measurement results, the basic settings of the printer can then be varied.

Nevertheless, the described densitometer is an autonomous device which, although it can be linked to the printer, remains an independent apparatus. The result of this is that the operating personnel has to operate an additional apparatus. It has therefore already been proposed to integrate the densitometer into the printer. This does not involve any substantial problems for large development labs, since such large development labs are not primarily designed to save space. On the other hand, this solution represents a considerable disadvantage for minilabs since, in addition to the printer, the wet-chemical sections are also closely fitted into these minilabs, and the need for space in minilabs plays a substantial role in times of increasing space shortage.

SUMMARY OF THE INVENTION

It is therefore an object of the present invention to provide an apparatus for which, on the one hand, no additional apparatus (separate densitometer) has to be operated by the operating personnel and which, on the other hand, is compact so that it can be integrated into a minilab without problems.

According to exemplary embodiments of the invention, this object can be solved by a copying device in which the transmission measuring system and the reflection measuring system are integrated, structurally speaking, in the area of a masters stage on which a master is conveyed, measured and copied onto the copy material. The result of this is that the operating personnel only has to operate a single apparatus, on the one hand, and on the other hand, this allows for a particularly space-saving apparatus. This is made clearer with the help of the detailed description.

One exemplary embodiment of a device according to the invention includes a masters stage upon which the measuring station for measuring the master, the exposure station for copying the master onto the copy material, and the transmission measuring system for measuring the test masters are arranged one immediately after the other along the conveyance route of the master, with a common illuminating device being provided that extends over and beyond the measuring station, the exposure station and the transmission measuring system. In this way, the measuring of the master, the copying of the master, and the measuring of test strips can be carried out with a single illuminating device. Thus, there is no need for further illuminating devices, which would otherwise be required separately for each station or system, and the device is thereby further simplified.

Another exemplary embodiment of a device according to the invention includes conveyance means that comprise a drive motor and that convey the masters through the transmission measuring system. The conveyance means are formed by the first conveyance means that convey the masters to the measuring station or, respectively, to the exposure station. In other words, the conveyance means that convey the masters through the measuring station for measuring or, respectively, through the exposure station for copying also convey the masters through the transmission measuring system. In this way, there is no need for several conveyance means for several stations, thus further reducing the cost of the apparatus. In particular, cost savings can be realized with an embodiment in which the measuring station, the exposure station and the transmission measuring system are arranged one directly after the other.

The aforementioned embodiment, in which the conveyance means for conveying test masters through the transmission measuring system are formed by the first conveyance means that convey the masters through the measuring station and the exposure station, can be improved upon by providing second conveyance means that convey the copies through the reflection measuring system, and by having these second conveyance means driven by the same drive motor as the fast conveyance means. In this embodiment, only one drive motor is required, thus further reducing the expense of the apparatus.

In another exemplary embodiment, in the area of the masters stage, in the direction of conveyance there is first a detection system to detect the beginning or the end, respectively, of the contents of the masters. The measuring station, the exposure station and the transmission measuring system can be located after the detection system. The signals generated by these stations or systems, respectively, and the signals created by the reflection measuring system are fed to a processing unit. A control computer is also provided which reads out the individual signals from this processing unit and which, based on the signals read out, generates corresponding control signals, e.g., for controlling the drive motor or for controlling the required quantities of copying light. In addition, this control computer further processes measurement data from the measuring station; for example, it determines from these measurement data the copying light quantities required for copying the master onto the copy material. This is a particularly simplified embodiment whereby the entire "intelligence" of the apparatus is limited to the control computer.

The above described exemplary embodiments of a device according to the invention are particularly advantageous and practical for use in a minilab for producing copies of photographic masters. Such a minilab has a copying station for copying the developed masters onto photographic copy material as well as a second developing station for developing the copy material. In the process, the copying station of such a minilab can comprise a device according to one of the above described embodiments.

BRIEF DESCRIPTION OF THE DRAWINGS

Other objects and advantages of the present invention will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
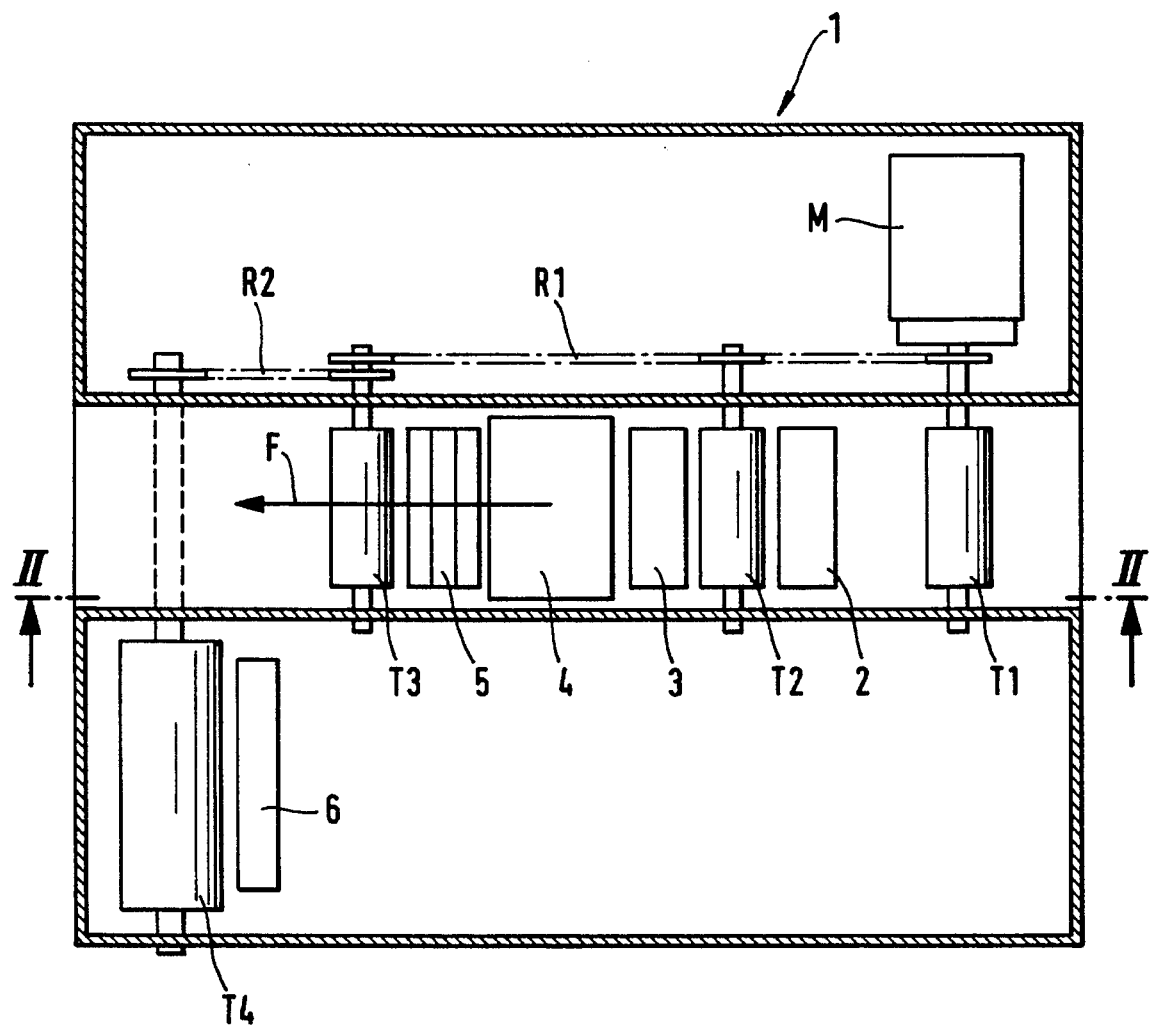
FIG. 1 shows a top view of the masters stage of an exemplary embodiment of a device according to the invention.

In the FIG. 1 top view of a masters stage 1, in accordance with an exemplary embodiment of a device according to the invention, one can see a basic arrangement of individual stations or systems, respectively, in the area of the masters stage 1. One can recognize a few pairs of conveying rollers, of which only the respective upper conveying rollers T1, T2, T3 and T4 are shown, as well as two continuous belts R1 and R2. The belt R1 is guided around the axes of the conveying rollers T1, T2 and T3 and the belt R2 is guided around the axes of the conveying rollers T3 and T4. One can alternately provide only a single continuous belt that is guided around all of the axes. The axis of conveying roller T1 is driven directly by a motor M, in particular a step motor. By guiding the belts R1 and R2 over the axes of the conveying rollers, these rollers can all be driven by the motor M during operation.

Furthermore, FIG. 1 illustrates a detection system 2 to detect the beginning or the end, respectively, of the contents of a master N (FIG. 2) and also a measuring station 3 to measure masters and an exposure station 4 to expose the masters N (negatives, for example) on copy material P (photographic paper, for example). In addition, one can also see a transmission measuring system 5 as well as a reflection measuring system 6.

Figure 2:
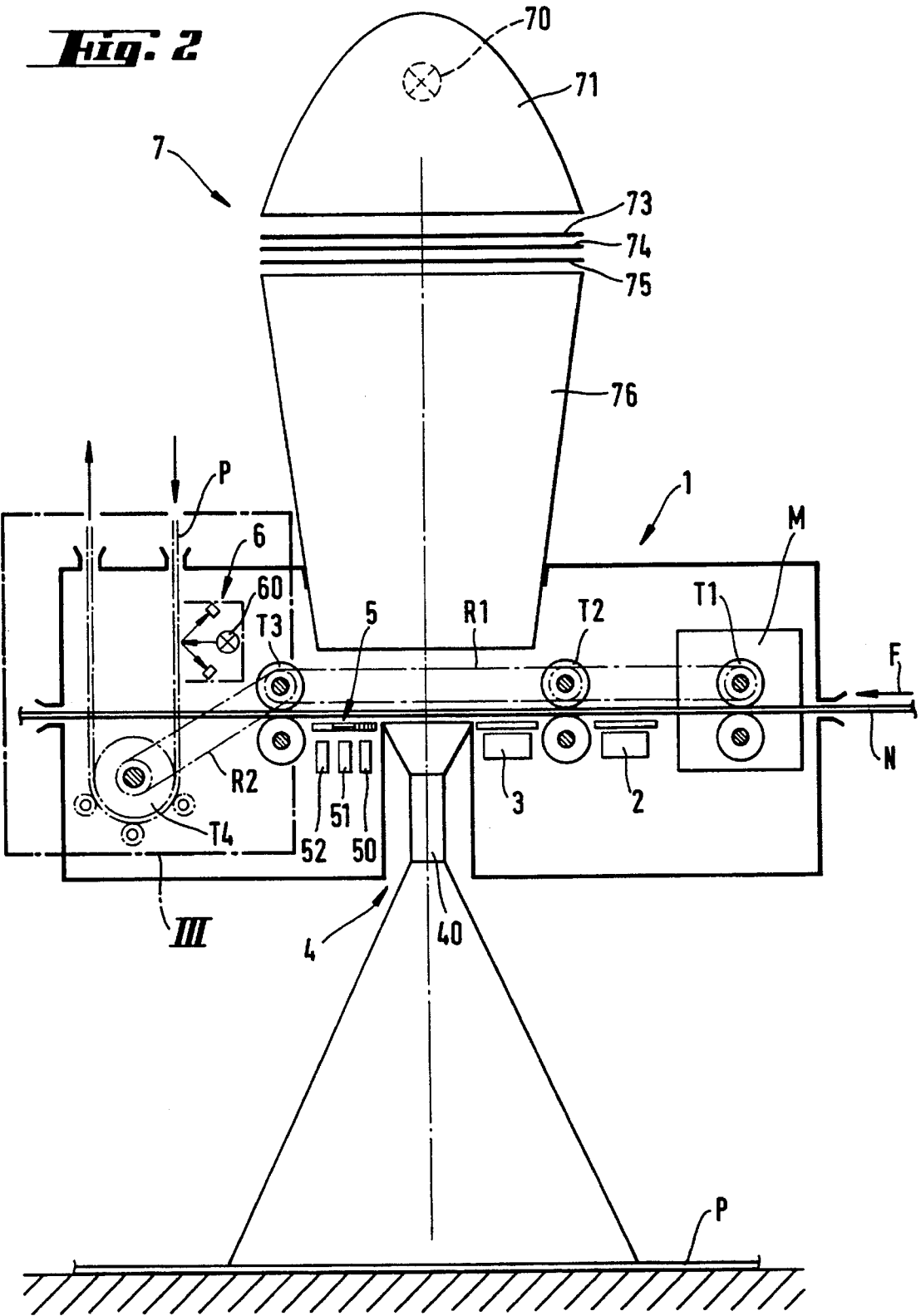
FIG. 2 shows a longitudinal section through the masters stage according to FIG. 1.

The longitudinal section through the masters stage 1, shown in FIG. 2, further clarifies how the individual stations or systems, respectively, are arranged. The belts R1 and R2 are shown here dashed and dotted to make it clear that they run behind the plane of projection, not in the plane of projection. The same applies to the reflection measuring system 6 and the copy material P shown there. In FIG. 2, in addition to the stations or systems already addressed with the help of the explanation of FIG. 1, one can also recognize an illuminating device 7. This comprises a light source 70, a reflector 71, filters and shutters 73, 74, 75, and a fight shaft 76 that leads the light to the masters stage. Furthermore, one can see a projection lens 40 for projecting the exposed master N onto the copy material P.

FIG. 2 roughly illustrates the function of an exemplary embodiment of a device according to the invention, specific details of which will be provided later. In the process, we will first describe how the test strips are handled in order to check the wet-chemical baths (not shown) or, respectively, to check the basic settings for copying.

To check the quality of the wet-chemical bath for developing the masters, a test master N, exposed in standard manner by the manufacturer and already developed in the bath to be checked, is conveyed on the masters stage 1 in the direction of the arrow F. This is done by having the step motor M drive the conveying roller T1, whereby all pairs of conveying rollers are driven by means of the belts R1 and R2. The test master N first reaches the detection device 2. There, the beginning and then the end of the contents of the test master N are detected (frame detection). The test master N subsequently reaches the measuring station 3. There, the real master will be measured later, during operation, by means of measuring devices typically used for this (such as known scanners). The measuring of the test master N by means of a scanner is only conditionally suitable for checking the quality of the wet-chemical bath for developing the masters, since the quality of the wet-chemical bath for developing the masters will be checked first and the scanner's sensitivity is adapted to the characteristics of the copy material P. An exposure in the exposure station 4 onto the copy material P when checking the wet-chemical bath for the masters is not required either, since for this purpose, essentially only the test masters N exposed in standardized manner have to be developed in the wet-chemical bath to be checked and then have to be measured, albeit with a standardized evaluation of the measured spectrum that deviates significantly from the evaluation of the spectrum by the scanner. For this reason, the exposure station 4 is placed right after the transmission measuring system 5. The latter comprises three sensors 50,51,52 for the colors red, green and blue. Before the developed test master is measured, the spectrum of the illuminating device 7 is first measured with the help of the sensors 50,51,52, i.e., a kind of calibration is carried out in order to determine which spectrum impacts the test master during the measurement. In the subsequent measuring of the test master with the help of the transmission measuring system 5, the spectrum detected by the sensors 50,51,52 is evaluated according to a prescribed norm—e.g., ANSI/ISO 5/3-1984, ANSI PH 2.18-1985. The values measured are then compared with the target values and, depending on the values determined, the wet-chemical bath for developing the masters is refreshed, regenerated, renewed or maintained unchanged.

Figure 3:
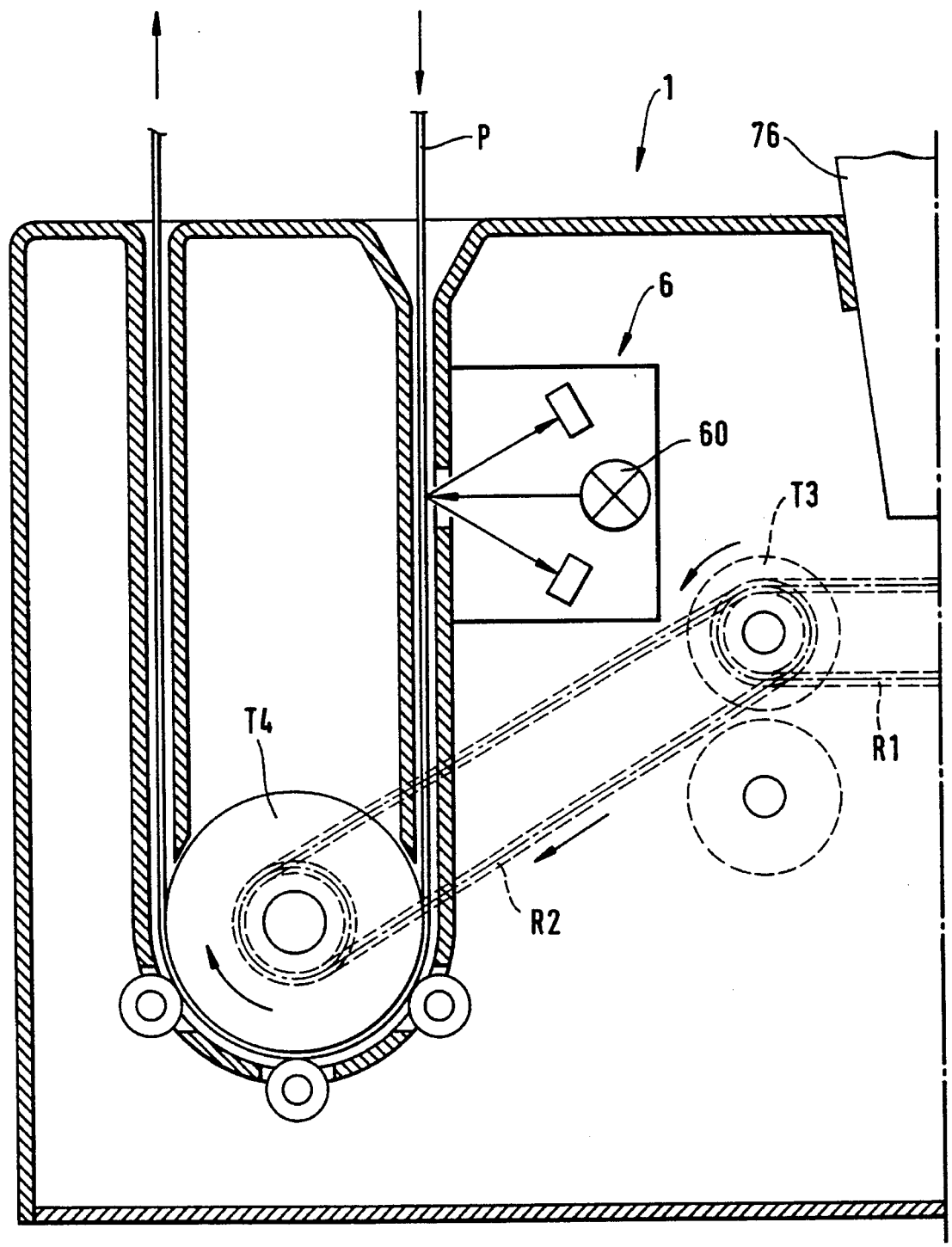
FIG. 3 shows Section III (the reflection system) of FIG. 2 enlarged.

To check the wet-chemical bath for developing the exposed copy material P, essentially the same procedure is used. As exemplary procedure can be clearly seen from FIG. 3. Test copies exposed in standard manner by the manufacturer are first developed in the wet-chemical bath to be checked, and are then conveyed through the reflection measuring system 6. Before measuring the developed test copies, the spectrum of the illuminating device 60 of the reflection measuring system 6 is first measured as well; i.e., a calibration is also carried out. In the subsequent measuring of the test copies with the reflection measuring system 6, the reflected light is detected and the spectrum is also evaluated according to a prescribed norm. In particular, the reflection measuring system can be an arrangement like the one described in U.S. Pat. No. 4,645,350. The values determined are again compared with target values and as a result, the wet-chemical bath for developing the exposed copy material is refreshed, regenerated, renewed or maintained unchanged.

After the required quality of the baths is ensured, the basic settings for copying still have to be checked. This can be done, for example, by measuring an already developed master N in the measuring station 3 and, with the determined copying light quantities, which can be controlled with the help of the filters or shutters 73,74,75, exposing it in the exposure station 4 onto the copy material P by means of the projection lens 40. The copy is then measured with the help of the reflection measuring system 6. Since the required quality of the wet-chemical sections is ensured, the settings for copying, in particular the exposure times with the light of various colors, can then be varied or maintained depending on the measurement values. The routine checks of the wet-chemical baths and the basic settings for copying are thereby completed and one can proceed with copying the masters.

Figure 4:
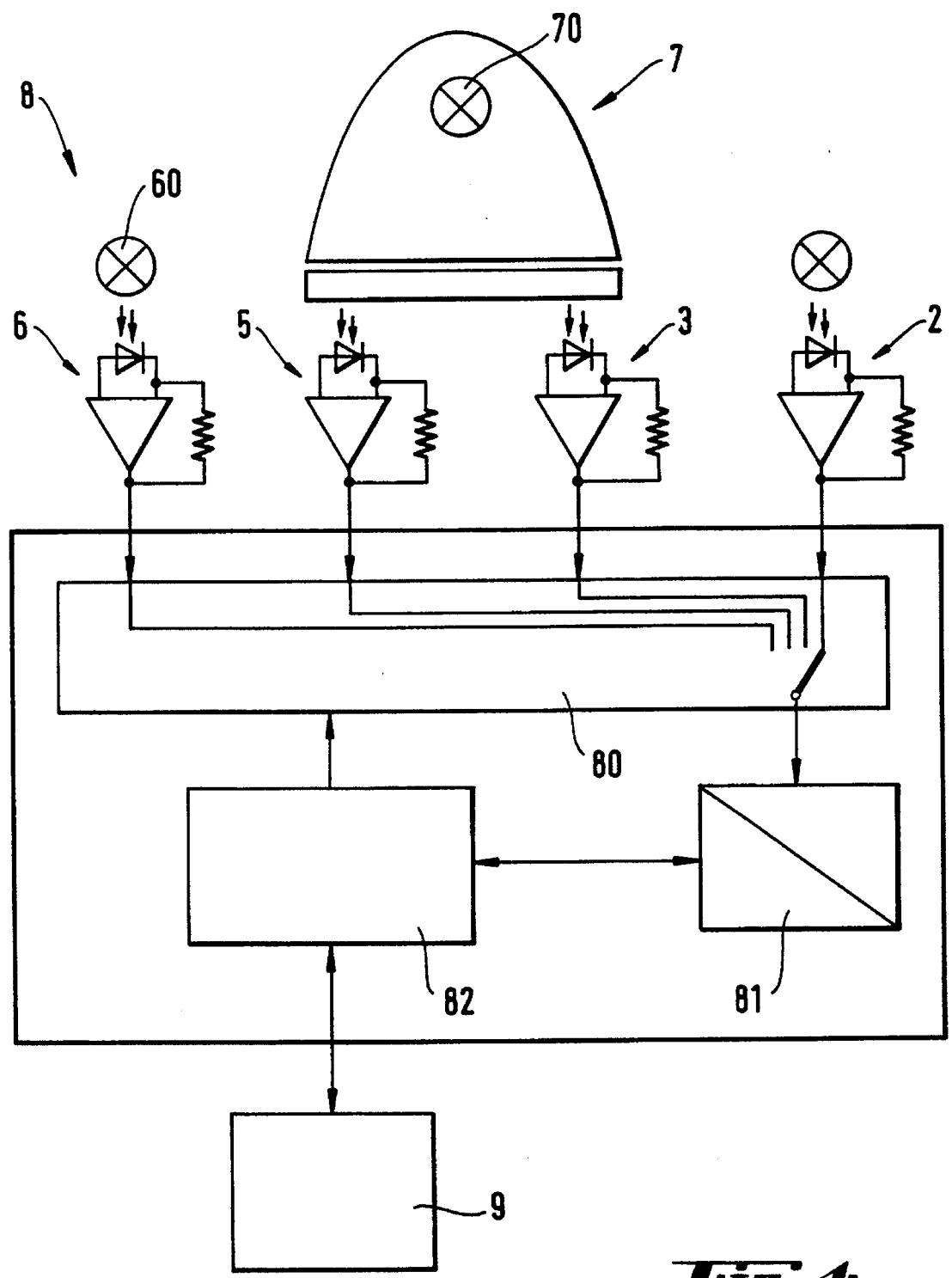
FIG. 4 shows a block diagram of the processing unit and the control computer of an exemplary embodiment of a device according to the invention.

FIGS. 2 and 4 illustrate copying of masters N onto copy material P. FIG. 4 shows, in addition to the stations or systems already shown in other figures, a processing unit 8 and a control computer 9. The function of the processing unit 8 and control computer will be explained. First the master N is conveyed with the help of the step motor M in the direction of the arrow F. The detection system 2 detects the beginning and the end of an image field present on the master (frame detection) and generates a signal which is forwarded by the processing unit 8 via, for example, a multiplexer 80, an A/D converter 81 and an interface 82, to the control computer 9. Based on this signal, the control computer 9 precisely controls the step motor M such that the image field (frame) of the master N is located over the measuring station 3 and can be measured (scanning). The measurement values are acquired by the control computer 9 via the A/D converter, and from these values the copying light quantities required for copying the image field of the master N onto the copy material P are determined. The control computer 9 then generates corresponding signals for controlling the filters or shutters 73, 74 and 75. In normal operation, i.e., when the check of the wet-chemical baths and the settings for copying is completed, the transmission measuring system 5 has no particular importance.

The copies produced in this manner from the master N are then measured with the help of the reflection measuring system 6 in the previously explained manner. The determined measurement values are also fed to the control computer 9 via the multiplexer 80 and the A/D converter 81. Since the master N has been measured before copying, the control computer 9 can supervise, by means of the values determined with the reflection measuring system 6, the setting for copying and, should the occasion arise, it can accordingly control the filters and shutters 73, 74 and 75.

At this point, it should be mentioned that the transmission measuring system 5 is also linked with the control computer 9 via the multiplexer 80 and the A/D converter 81 and the interface 82. Thus, the checking of the wet-chemical baths can also take place by means of the same processing unit 8 and with the same control computer 9 as in normal copying operation.

Exemplary embodiments of the present invention provide numerous advantages. For example, the operating personnel only have to operate a single apparatus, since there is no need for a separate apparatus that comprises a transmission measuring system and a reflection measuring system for checking the baths. Further, the integration of these systems into the masters stage allows for a particularly space-saving apparatus. In addition, the measuring of the master, the copying of the master and the measuring of test strips can take place with a single illuminating device. This means there is no need for further illuminating devices, which would otherwise be required separately for each station or system, and the device is thereby further simplified. The conveyance means which convey the masters through the measuring station for measuring and through the exposure station for copying also convey the test masters through the transmission measuring system. In this way, there is no need for several conveyance means for several stations, thus further reducing the cost of the apparatus. By means of the described conveyance means for the reflection measuring system, it is even possible for the conveyance means which enables copies and test copies to be conveyed through the reflection measuring system to be driven by the same drive motor as the conveyance means that convey the masters or test masters. Thus, only one drive motor is required, signifying a further reduction in apparatus cost.

Exemplary embodiments of the processing unit and its working together with the control computer result in a simplified apparatus, in which the entire "intelligence" of the apparatus is limited to the control computer. The described embodiments of devices according to the invention are particularly practical for use in the copying station in a complete minilab for producing copies of photographic masters.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Apparatus for copying photographic masters onto photographic copying material, comprising:

a masters stage on which a master is conveyed by a first conveyance means to a measuring station where the master is measured, such that copying light quantities required for exposure of the master can be determined;

an exposure station where the master is impacted with the determined copying light quantities and copied onto the copy material; and at least one of a transmission measuring system and a reflection measuring system, in addition to said measuring station, for measuring a test master or a test copy, said at least one of the transmission measuring system and the reflection measuring system being structurally integrated with the masters stage.

2. Apparatus according to claim 1, wherein the measuring station, the exposure station and the transmission measuring system are arranged one immediately after the other along a conveyance route of the master, said apparatus further including:

a common illuminating device which extends over the measuring station, the exposure station and the transmission measuring system.

3. Apparatus according to claim 2, wherein said first conveyance means further includes:

a drive motor for conveying the master through the transmission measuring system, the measuring station and the exposure station, respectively.

4. Apparatus according to claim 1, wherein said first conveyance means further includes:

a drive motor for conveying the master through the transmission measuring system, the measuring station and the exposure station, respectively.

5. Apparatus according to claim 3, further including:

a second conveyance means for conveying a copy produced from said master through the reflection measuring system, said second conveyance means being driven by said drive motor.

6. Apparatus according to claim 1, further including:

a detection system on the masters stage, in the direction of conveyance, to detect a beginning or an end, respectively, of contents of the master or the test master, said measuring station, said exposure station and said transmission measuring system being arranged one after the other along said direction of conveyance;

a processing unit for receiving signals generated by the detection system or said stations, respectively, and for receiving signals generated by the reflection measuring system; and a control computer which sorts signals from the processing unit and which, based on the sorted signals, generates corresponding control signals for the apparatus.

7. Apparatus according to claim 6, wherein said first conveyance means further includes:

a drive motor controlled by said control signals, said control computer further processing measurement data from the measuring station to determine a quantity of copying light required for copying the master onto the copy material, and processing measurement data from the transmission measuring system or reflection measuring system, respectively, to provide information on a condition of wet-chemical developing baths.

8. A system for producing at least one copy of a photographic master, with a copying station for copying a developed master onto photographic copy material and with a developing station for developing the copy material, said copying station further comprising:

a masters stage on which a master is conveyed by a first conveyance means to a measuring station where the master is measured, such that copying light quantities required for exposure of the master can be determined;

an exposure station where the master is impacted with the determined copying light quantities and copied onto the copy material; and at least one of a transmission measuring system, and a reflection measuring system in addition to said measuring station, for measuring a test master or a test copy, said at least one of the transmission measuring system and the reflection system being structurally integrated with the masters stage.

* * * * *